United States Patent [19]

Kohlmeier

[11] Patent Number: 5,221,332
[45] Date of Patent: Jun. 22, 1993

[54] INK COMPOSITIONS

[75] Inventor: Julia A. Kohlmeier, Rochester, N.Y.

[73] Assignee: Xerox Corporation, Stamford, Conn.

[21] Appl. No.: 693,182

[22] Filed: Apr. 29, 1991

[51] Int. Cl.$^5$ ............................................. C09D 11/02
[52] U.S. Cl. ................................ 106/20 C; 106/20 D; 346/1.1
[58] Field of Search ......... 106/23, 22, 20, 29, 106/482, 287.34; 427/256, 146; 524/474

[56] References Cited

U.S. PATENT DOCUMENTS

| | | | |
|---|---|---|---|
| 3,945,957 | 3/1976 | Noshiro et al. | 260/3.3 |
| 3,948,827 | 4/1976 | Noshiro et al. | 260/3.3 |
| 4,750,942 | 6/1988 | van Dijk et al. | 134/25.2 |
| 4,765,243 | 8/1988 | Schiefer et al. | 101/451 |
| 4,789,399 | 12/1988 | Williams et al. | 106/20 |
| 4,836,852 | 6/1989 | Knirsch et al. | 106/22 |
| 4,840,670 | 6/1989 | Hughes et al. | 106/19 |
| 4,877,451 | 10/1989 | Winnik et al. | 106/23 |
| 5,019,166 | 5/1991 | Schwarz | 106/22 |

FOREIGN PATENT DOCUMENTS 90355062 9/1989 European Pat. Off. .
2094820 3/1982 United Kingdom .

Primary Examiner—Mark L. Bell
Assistant Examiner—Margaret Einsmann
Attorney, Agent, or Firm—Judith L. Byorick

[57] ABSTRACT

An ink composition which comprises an aqueous liquid vehicle, a colorant, and silica particles in an amount of from about 0.1 to about 5 percent by weight. The inks are particularly suited for ink jet printing processes, including thermal ink jet printing processes, and exhibit increased drop volume and increased drop velocity when employed in ink jet printing processes.

21 Claims, No Drawings

INK COMPOSITIONS

BACKGROUND OF THE INVENTION

The present invention is directed to liquid ink compositions. More specifically, the present invention is directed to aqueous based in compositions particularly for use in ink jet printing processes. One embodiment of the present invention is directed to an ink composition which comprises an aqueous liquid vehicle, a colorant, and silica particles in an amount of from about 0.5 to about 5 percent by weight.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Known ink jet inks generally comprise a water soluble dye which is soluble in an ink vehicle such as water or a mixture comprising water and a water soluble or water miscible organic solvent. Heterophase ink jet inks are also known.

U.S. Pat. No. 4,877,451 (Winnik et al.), the disclosure of which is totally incorporated herein by reference, discloses ink jet compositions comprising water, a solvent, and a plurality of colored particles comprising hydrophilic porous silica particles to the surfaces of which dyes are covalently bonded through silane coupling agents. In addition, copending application U.S. Ser. No. 07/369,002, the disclosure of which is totally incorporated herein by reference, discloses ink jet inks and liquid developers containing colored particles comprising hydrophilic porous silica particles to the surfaces of which dyes are covalently bonded through silane coupling agents.

U.S. Pat. No. 3,945,957 (Noshiro et al.) discloses a dry planographic printing ink composition which comprises a vehicle for an ink, a pigment and a solvent, characterized by using as a portion of the vehicle 1 to 40 percent by weight of a silicone modified alkyd resin containing 5 to 50 percent by weight of organopolysiloxanes of a specific formula.

U.S. Pat. No. 3,948,827 (Noshiro et al.) discloses a dry planographic printing ink composition which comprises a vehicle for an ink, a pigment, and a solvent characterized by using as a portion of the vehicle 1 to 40 percent by weight of a silicone modified alkyd resin containing 5 to 50 percent by weight of at least one organopolysiloxane substituted by amino groups of a specific formula.

U.S. Pat. No. 4,765,243 (Schiefer et al.) discloses a method of flexographic or rotogravure printing onto a plastic substrate using a water-based ink, wherein the improvement comprises adding to the ink from about 0.0005 to about 5 weight percent of a low molecular weight silicone compound. The incorporation of the silicone compound provides good wetting of the substrate by the ink and results in improved printing characteristics.

U.S. Pat. No. 4,836,852 (Kairsch et al.) discloses an ink formed by a solution of a direct dye in a mixture of water and glycol wetting agents, to which a pigment which is finely ground to particles of dimension of not more than 1000 Angstroms is added in dispersion, in a concentration of between 0.1 and 2 percent. The pigment particles serve to anchor the gaseous nuclei of gases which are dissolved in the ink for the purpose of stabilizing the boiling point of the ink. The ink is particularly suited to an ink jet printer of the type in which expulsion of the droplets is produced by causing instantaneous vaporization of a portion of ink in a nozzle.

Copending application U.S. Ser. No. 07/544,564, entitled "Inks Containing Colored Block Copolymer Micelles", with the named inventors Francoise M. Winnik, Peter Hofstra, and Paul J. Gerroir, the disclosure of which is totally incorporated herein by reference, discloses an ink composition which comprises an aqueous liquid vehicle and colored particles of an average diameter of 50 nanometers or less which comprise micelles of block copolymers of the formula ABA, wherein A represents a hydrophilic segment and B represents a hydrophobic segment, and wherein dye molecules are covalently attached to the micelles. Optionally, silica is precipitated within the micelles. Also disclosed is an ink preparation process which comprises, in the order stated (1) adding to water a block copolymer of the formula ABA, wherein A represents a hydrophilic segment and B represents a hydrophobic segment, thereby forming a dispersion of micelles of the block copolymer; (2) adding a water-soluble base to the dispersion, thereby bringing the pH of the dispersion to at least 8; (3) adding to the dispersion a solution comprising water and a reactive dye capable of reacting with the block copolymer, thereby forming colored polymeric micelles; and (4) admixing the colored micelles with an aqueous liquid vehicle to form an ink composition. Optionally, silica is precipitated in the micelles by addition of a tetraalkoxysilane to the micelles prior to addition of the water-soluble base.

Copending application U.S. Ser. No. 07/646,046, entitled "Ink Compositions", with the named inventors Francoise M. Winnik, Marcel P. Breton, and William Riske, the disclosure of which is totally incorporated herein by reference, discloses an ink composition which comprises an aqueous liquid vehicle, a water-soluble dye, and particles of a block copolymer of the formula ABA, wherein A represents a hydrophilic segment and B represents a hydrophobic segment, said ABA particles having an average diameter of about 300 Angstroms or less. The ink is particularly suitable for use in ink jet printing systems, especially thermal ink jet printing systems.

Although known compositions and processes are suitable for their intended purposes, a need remains for improved ink compositions suitable for use in ink jet printing processes. In addition, a need remains for ink compositions that enable increased drop volume when employed in ink jet printing processes. Further, there is a need for ink compositions that enable drop velocity when employed in ink jet printing processes.

SUMMARY OF THE INVENTION

It is an object of the present invention to provide improved ink compositions suitable for use in ink jet printing processes.

It is another object of the present invention to provide ink compositions that enable increased drop volume when employed in ink jet printing processes.

It is yet another object of the present invention to provide ink compositions that enable increased drop velocity when employed in ink jet printing processes.

These and other objects of the present invention can be achieved by providing an ink composition which comprises an aqueous liquid vehicle, a colorant, and silica particles in an amount of from about 0.5 to about 5 percent by weight. Another embodiment of the present invention is directed to a printing process which comprises applying an ink according to the present invention to a substrate in imagewise fashion. In a specific embodiment, the present invention includes a process which comprises incorporating into an ink jet printing apparatus an ink composition according to the present invention and causing droplets of the ink to be ejected in an imagewise pattern onto a substrate, thereby generating images on the substrate. In a particularly preferred embodiment, the apparatus is a thermal ink jet printer and the ink is selectively heated in imagewise fashion, thereby causing ejection of the droplets to form an image on the substrate.

The liquid vehicle of the inks of the present invention may consist of water, or it may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside of these ranges. The non-water component of the liquid vehicle generally serves as a humectant which has a boiling point higher than that of water (100° C.). In the inks employed for the process of the present invention, the liquid vehicle is present in any effective amount, typically from about 85 to about 99.5 percent by weight, and preferably from about 90 to about 99 percent by weight, although the amount can be outside of these ranges.

Inks of the present invention contain a colorant. Generally, any effective colorant, such as one of the direct dyes or the acid dyes, can be selected as the colorant, provided that it is compatible with the other ink components and is soluble in the liquid vehicle. Examples of suitable dyes include anthraquinones, monoazo dyes, disazo dyes, phthalocyanines, aza[18]annulenes, formazan copper complexes, triphenodioxazines, Bernacid Red 2BMN; Pontamine Brilliant Bond Blue A; Pontamine: Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarine Brilliant Red X-2B (Reactive Red 56), available from Pylam, Inc.; Levafix Brilliant Red F-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A.Y.34; Telon Fast Yellow 4GL-175; BASF Basacid Black SE 0228; the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), Pro-Jet Yellow 1-G (Direct Yellow 132), Aminyl Brilliant Red F-B, available from Sumitomo Chemical Company (Japan), the Duasyn line of "salt-free" dyes available from Hoechst, such as Duasyn 31), Duasyn Direct Yellow 6G-SF VP216 (Direct Yellow 157), Duasyn Brilliant Yellow GL-SF VP220 (Reactive Yellow 37), Duasyn Acid Yellow XX-SF LP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), Duasyn Acid Blue AE-SF VP344 (Acid Blue 9), and the like, as well as mixtures thereof. The dye is present in the ink composition in any effective amount, typically from about 0.5 to about 15 percent by weight, and preferably from about 3 to about 6 percent by weight, although the amount can be outside of these ranges.

The inks of the present invention also contain silica particles. Any silica particles capable of being dispersed in an aqueous ink are suitable. The silica particles employed for the inks of the present invention generally are colorless. Preferably, the silica particles have an average particle diameter of less than about 0.1 micron. Examples of suitable silica particles include aqueous MOX 80 (K342), an aqueous dispersion of silica particles available from Degussa, aqueous MOX 170 (K315), another aqueous dispersion of silica particles available from Degussa, and the like. The silica particles are present in the inks of the present in any effective amount, typically from about 0.1 to about 5 percent by weight, preferably from about 0.5 to about 5 percent by weight, and more preferably from about 1 to about 1.5 percent by weight, although the amount can be outside of these ranges.

Other additives can also be present in the inks of the present invention. For example, if the silica particles for the ink composition are not obtained in the form of a commercially available aqueous dispersion, surfactants or wetting agents may be added to the ink. These additives may be of the cationic, anionic, or nonionic types. Suitable surfactants and wetting agents include Tamol ® SN, Tamol ® LG, those of the Triton ® series available from Rohm and Haas Company, those of the Marasperse ® series, those of the Igepal ® series available from GAF Company, those of the Tergitol ® series, those of the Duponol ® series available from E. I. Du Pont de Nemours & Company, Emulphor ON 870 and ON 877, available from GAF, and other commercially available surfactants. These surfactants and wetting agents are present in effective amounts, generally from 0 to about 15 percent by weight, and preferably from about 0.01 to about 8 percent by weight, although the amount can be outside of these ranges.

Polymeric additives can also be added to the inks of the present invention to enhance the viscosity of the ink, including water soluble polymers such as Gum Arabic, polyacrylate salts, polymethacrylic salts, polyvinyl alcohols, hydroxy propylcellulose, hydroxyethylcellulose, polyvinylpyrrolidinone, polyvinylether, starch, polysaccharides, and the like. Polymeric additives may be present in the ink of the present invention in any effective amount, typically from 0 to about 10 percent by weight, and preferably from about 0.01 to about 5 percent by weight, although the amount can be outside of these ranges.

Other optional additives to the inks of the present invention include biocides such as Dowicil 150, 200, and 75, benzoate salts, sorbate salts, and the like, typically present in an amount of from about 0.0001 to about 4 percent by weight, and preferably from about 0.01 to about 2.0 percent by weight, although the amount can be outside of these ranges, humectants and penetration control additives such as ethylene glycol, diethyleneglycol, N-methylpyrollidinone, propylene glycol, hydroxyethers, ethers, amides, sulfoxides, ketones, lactones, esters, alcohols, butyl carbitol, benzyl alcohol, cyclohexylpyrrolidinone, 1,2-hexanediol, and the like, typically present in an amount of from 0 to about 50 percent by weight, and preferably from about 5 to about 40 percent by weight, although the amount can be outside of these ranges, pH controlling agents such as acids or bases, phosphate salts, carboxylates salts, sulfite salts, amine salts, and the like, typically present in an amount of from 0 to about 1 percent by weight and preferably from about 0.01 to about 1 percent by weight, although the amount can be outside of these ranges, or the like.

Inks of the present invention can be prepared by any process suitable for preparing aqueous-based inks. For example, the ink ingredients can be mixed in the desired amounts and stirred until a uniform ink composition results (typically about 30 minutes, although the mixing/stirring time can be either greater or less than this period). While not required, the ink ingredients can be heated during mixing if desired. Subsequent to mixing and stirring, the ink composition generally is filtered to remove any solid or particulate matter. In one specific embodiment of the present invention, an ink is prepared by adding to an aqueous dye solution the liquid vehicle components desired for the ink, such as water and a humectant, mixing the ingredients at room temperature, filtering the mixture through a 3 micron filter, and subsequently adding an aqueous dispersion of silica particles to the mixture and mixing the ingredients. Any other suitable processes for preparing the inks can also be employed.

The present invention is also directed to a printing process which comprises applying an ink according to the present invention to a substrate in imagewise fashion. In a specific embodiment, the present invention includes a process which comprises incorporating into an ink jet printing apparatus an ink composition according to the present invention and causing droplets of the ink to be ejected in an imagewise pattern onto a substrate, thereby generating images on the substrate. In a particularly preferred embodiment, the apparatus is a thermal ink jet printer and the ink is selectively heated in imagewise fashion, thereby causing ejection of the droplets to form an image on the substrate. The ink compositions of the present invention can be used to form images on a wide variety of substrates, including plain papers such as Xerox® 4024 papers, Xerox® 4200 papers, Xerox® 10 series papers, canary ruled paper, ruled notebook paper, bond paper such as Gilbert 25 percent cotton bond paper, Gilbert 100 percent cotton bond paper, and Strathmore bond paper, silica coated papers such as Sharp Company silica coated paper, JuJo paper, and the like, transparency materials such as Xerox® 3R3351, Tetronix ink jet transparencies, Arkright ink jet transparencies, and the like, fabrics, textile products, plastic, polymeric films, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared as follows. Food Black #2 Dye (0.75 gram) was added to a first beaker and a mixture of diethylene glycol (1.31 grams) and distilled water (22.94 grams was added to a second beaker. Subsequently, the water/diethylene glycol mixture was added with mixing to the beaker containing the dye. The resulting mixture was stirred for about 5 minutes and then filtered through a 5 micron filter. Thereafter, 0.297 gram of MOX 80 (K342) aqueous silica dispersion (obtained from Degussa) was added to 24.7 grams of the filtered dye/water/diethylene glycol mixture. The resulting mixture was stirred for about one minute to obtain an ink composition of the present invention. For comparative purposes, another ink was made by the same process except that no silica particles were added to the ink.

The inks thus prepared were then incorporated into a thermal ink jet printing test fixture and the inks were jetted through the nozzles at room temperature (ink heated to 280° C. by heater to eject droplets) at a pulse width of 3 microseconds, a frequency of 1,000 hertz, and a voltage of 32.3 volts (which was 10 percent above the threshold voltage required to eject drops of the ink). The drop volumes obtained over a number of pulses for each ink were as follows:

| Number of pulses | Drop volume (picoliters) |
| --- | --- |
| $2.5 \times 10^5$ | 77.1 |
| $1.2 \times 10^6$ | 81.5 |
| $3.9 \times 10^6$ | 83.4 |
| $8.0 \times 10^6$ | 83.5 |
| $1.0 \times 10^7$ | 88.1 |
| $1.6 \times 10^7$ | 85.0 |
| $1.9 \times 10^7$ | 83.6 |
| $2.0 \times 10^7$ | 84.5 |

Ink containing no silica particles

| Number of pulses | Drop volume (picoliters) |
| --- | --- |
| $6.0 \times 10^5$ | 111.7 |
| $8.5 \times 10^5$ | 112.7 |
| $9.0 \times 10^5$ | 118.3 |
| $1.0 \times 10^6$ | 117.7 |
| $1.6 \times 10^6$ | 119.2 |
| $4.0 \times 10^6$ | 119.2 |
| $6.7 \times 10^6$ | 120.2 |
| $8.5 \times 10^6$ | 129.5 |
| $1.0 \times 10^7$ | 130.6 |

Ink containing MOX 80 (K342) silica particles

As the data indicate, the ink containing no silica particles exhibited a maximum drop volume of 88.1 picoliters and an average drop volume of 83.3 picoliters, whereas the ink containing MOX 80 (K342) silica particles exhibited a maximum drop volume of 130.6 picoliters and an average drop volume of 119.9 picoliters. The ink containing MOX 80 (K342) silica particles exhibited a 43.9 percent increase in average drop volume.

EXAMPLE II

An ink composition was prepared as follows. Food Black #2 Dye (0.75 gram) was added to a first beaker and a mixture of diethylene glycol (1.31 grams) and distilled water (22.94 grams) was added to a second beaker. Subsequently, the water/diethylene glycol mixture was added with mixing to the beaker containing the dye. The resulting mixture was stirred for about 5 minutes and then filtered through a 5 micron filter. Thereafter, 0.83 gram of MOX 170 (K315) aqueous silica dispersion (obtained from Degussa) was added to 24.17 grams of the filtered dye/water/diethylene glycol mixture. The resulting mixture was stirred for about one minute to obtain an ink composition of the present invention.

The ink thus prepared was then incorporated into a thermal ink jet printing test fixture and the ink was jetted through the nozzles at room temperature (ink heated to 280° C. by heater to eject droplets) at a pulse width of 3 microseconds, a frequency of 1,000 hertz, and a voltage of 32.3 volts (which was 10 percent above the threshold voltage required to eject drops of the ink). The drop volumes obtained over a number of pulses for the ink were as follows:

| Number of pulses | Drop volume (picoliters) |
| --- | --- |
| $1.3 \times 10^5$ | 102.4 |
| $4.5 \times 10^5$ | 97.5 |
| $5.0 \times 10^5$ | 95.4 |
| $8.2 \times 10^5$ | 103.9 |
| $1.5 \times 10^6$ | 102.2 |
| $2.1 \times 10^6$ | 99.1 |
| $1.09 \times 10^7$ | 96.4 |

-continued

| Number of pulses | Drop volume (picoliters) |
| --- | --- |
| $1.28 \times 10^7$ | 97.4 |

Ink containing MOX 170 (K315) silica particles

As the date indicate, the ink containing MOX 170 (K315) silica particles exhibited a maximum drop volume of 103.9 picoliters and an average drop volume of 99.3 picoliters. The ink containing MOX 170 (K315) silica particles exhibited a 19.2 percent increase in average drop volume over the ink (data in Example I) containing no silica particles.

Other embodiments and modifications of the present invention may occur to those skilled in the art subsequent to a review of the information presented herein; these embodiments and modifications, as well as equivalents thereof, are also includes within the scope of this invention.

What is claimed is:

1. An ink composition which consists essentially of water, a water-miscible organic liquid, a colorant in an amount of at least about 0.5 percent by weight, an optional surfactant, an optional biocide, an optional pH controlling agent, and silica particles in an amount of from about 0.1 to about 5 percent by weight.

2. An ink composition according to claim 1 wherein the water-miscible organic component is selected from the group consisting of ethylene glycol, propylene glycol, diethylene glycols, glycerine, dipropylene glycol, polyethylene glycols, polypropylene glycols, amides, ethers, carboxylic acids, esters, alcohols, organosulfides, organosulfoxides, sulfones, dimethylsulfoxide, sulfolane, alcohol derivatives, ether derivatives, amino alcohols, ketones, and mixtures thereof.

3. An ink composition according to claim 1 wherein the water-miscible organic liquid is present in an amount of from about 3 to about 70 percent by weight.

4. An ink composition according to claim 1 wherein the water-miscible organic liquid is diethylene glycol.

5. An ink composition according to claim 4 wherein the diethylene glycol is present in an amount of from about 4.5 to about 6.5 percent by weight.

6. An ink composition according to claim 1 wherein the colorant is Food Black 2 dye.

7. An ink composition according to claim 1 wherein the silica particles have an average particle diameter of less than 0.1 micron.

8. An ink composition according to claim 1 wherein the silica particles are present in an amount of from about 0.5 to about 5 percent by weight.

9. In a printing process which comprises (1) incorporating into an ink jet printing apparatus an ink composition; and (2) causing droplets of the ink to be ejected in an imagewise pattern onto a substrate, thereby generating images on the substrate, the improvement which comprises employing an ink composition which comprises an aqueous liquid vehicle, a colorant, and silica particles in an amount of from about 0.1 to about 5 percent by weight.

10. A printing process according to claim 9 wherein the ink jet printing apparatus is a thermal ink jet printer and the ink in the printer is selectively heated in an imagewise pattern, thereby causing droplets to be ejected in an imagewise pattern.

11. A printing process according to claim 9 wherein the liquid vehicle comprises a mixture of water and a water-miscible organic component.

12. A printing process according to claim 11 wherein the water-miscible organic component is selected from the group consisting of ethylene glycol, propylene glycol, diethylene glycols, glycerin, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, ether derivatives, amino alcohols, ketones, and mixtures thereof.

13. A printing process according to claim 11 wherein the water-miscible organic component is present in an amount of from about 3 to about 70 percent by weight.

14. A printing process according to claim 11 wherein the water-miscible organic component is diethylene glycol.

15. A printing process according to claim 14 wherein the diethylene glycol is present in an amount of from about 4.5 to about 6.5 percent by weight.

16. A printing process according to claim 9 wherein the colorant is Food Black 2 dye.

17. A printing process according to claim 9 wherein the silica particles have an average particle diameter of less than 0.1 micron.

18. A printing process according to claim 9 wherein the silica particles are present in an amount of from about 0.5 to about 5 percent by weight.

19. An ink composition which consists essentially of water, a water-miscible organic liquid, a colorant in an amount of at least about 0.5 percent by weight, an optional surfactant, an optional biocide, an optional pH controlling agent, and colorless silica particles in an amount of from about 0.1 to about 5 percent by weight.

20. In a printing process which comprises (1) incorporating into an ink jet printing apparatus an ink composition; and (2) causing droplets of the ink to be ejected in an imagewise pattern onto a substrate, thereby generating images on the substrate, the improvement which comprises employing an ink composition which comprises an aqueous liquid vehicle, a colorant, and colorless silica particles in an amount of from about 0.1 to about 5 percent by weight.

21. In a printing process which comprises (1) incorporating into an ink jet printing apparatus an ink composition; and (2) causing droplets of the ink to be ejected in an imagewise pattern onto a substrate, thereby generating images on the substrate, the improvement which comprises employing an ink composition which consists essentially of water, a water-miscible organic liquid, a colorant, an optional surfactant, an optional biocide, an optional pH controlling agent, and colorless silica particle sin an amount of from about 0.1 to about 5 percent by weight.

* * * * *